US011075822B1

(12) United States Patent
Martin et al.

(10) Patent No.: US 11,075,822 B1
(45) Date of Patent: Jul. 27, 2021

(54) SYSTEM AND METHOD FOR IMPROVED PERFORMANCE QOS WITH SERVICE LEVELS AND STORAGE GROUPS

(71) Applicant: EMC IP Holding Company, LLC, Hopkinton, MA (US)

(72) Inventors: Owen Martin, Hopedale, MA (US); Malak Alshawabkeh, Franklin, MA (US); Benjamin Allen Fitz Randolph, Uxbridge, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 539 days.

(21) Appl. No.: 15/784,598

(22) Filed: Oct. 16, 2017

(51) Int. Cl.
| | |
|---|---|
| G06F 15/173 | (2006.01) |
| H04L 12/24 | (2006.01) |
| H04L 12/26 | (2006.01) |
| H04L 29/08 | (2006.01) |

(52) U.S. Cl.
CPC ...... H04L 41/5019 (2013.01); H04L 43/0852 (2013.01); H04L 67/1097 (2013.01)

(58) Field of Classification Search
CPC ............. H04L 41/5019; H04L 43/0852; H04L 67/1097; G06F 3/061
USPC ....................................................... 709/224
See application file for complete search history.

(56) References Cited

U.S. PATENT DOCUMENTS

| | | | | |
|---|---|---|---|---|
| 6,041,352 A | * | 3/2000 | Burdick .............. | H04L 41/0659 370/253 |
| 7,319,667 B1 | * | 1/2008 | Biederman ............. | H04L 47/10 370/230.1 |
| 2002/0136233 A1 | * | 9/2002 | Chen .................. | H04W 72/1215 370/445 |
| 2003/0020671 A1 | * | 1/2003 | Santoro ................. | G06F 3/0481 345/1.3 |
| 2004/0098478 A1 | * | 5/2004 | Koetke ............... | H04L 43/0852 709/224 |
| 2008/0222640 A1 | * | 9/2008 | Daly ..................... | G06F 9/4881 718/103 |
| 2010/0082855 A1 | * | 4/2010 | Accapadi .............. | G06F 13/364 710/39 |
| 2011/0185213 A1 | * | 7/2011 | Yoshida .................... | G06F 1/26 713/340 |
| 2013/0060960 A1 | * | 3/2013 | Sang ....................... | H04L 47/36 709/233 |
| 2013/0074087 A1 | * | 3/2013 | Chambliss ........... | G06F 9/4881 718/103 |
| 2013/0080559 A1 | * | 3/2013 | Rao .................... | H04L 29/08549 709/208 |
| 2014/0195699 A1 | * | 7/2014 | Sokol, Jr. ................ | G06F 13/37 710/40 |

(Continued)

*Primary Examiner* — Ryan J Jakovac
(74) *Attorney, Agent, or Firm* — Brian J. Colandreo; Mark H. Whittenberger; Holland & Knight LLP

(57) ABSTRACT

A method, computer program product, and computer system for receiving, by a computing device, a first I/O request from a first application in a first storage group assigned to a first storage level. A response time for the first I/O request may be identified. It may be identified that the response time for the first I/O request is outside a pre-determined response time. A delay may be added to a second I/O request received from a second application in a second storage group assigned to a second storage level based upon, at least in part, identifying that the response time for the first I/O request is outside the pre-determined response time.

17 Claims, 7 Drawing Sheets

(56) References Cited

U.S. PATENT DOCUMENTS

2015/0081948 A1* 3/2015 Thereska ............... H04L 47/10
                                                    711/103
2016/0378703 A1* 12/2016 Candelaria .......... G06F 13/1668
                                                    710/113

* cited by examiner

SYSTEM AND METHOD FOR IMPROVED PERFORMANCE QOS WITH SERVICE LEVELS AND STORAGE GROUPS

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to receiving, by a computing device, a first I/O request from a first application in a first storage group assigned to a first storage level. A response time for the first I/O request may be identified. It may be identified that the response time for the first I/O request is outside a pre-determined response time. A delay may be added to a second I/O request received from a second application in a second storage group assigned to a second storage level based upon, at least in part, identifying that the response time for the first I/O request is outside the pre-determined response time.

One or more of the following example features may be included. The pre-determined response time may include a minimum response time specified by the first storage level and a maximum response time specified by the first storage level. It may be determined that a response time for a third I/O request from the first application in the first storage group assigned to the first storage level is unchanged from the response time for the first I/O request and the delay may be precluded from being added to a fourth I/O request received from the second application in the second storage group assigned to the second storage level based upon, at least in part, determining that the response time for the third I/O request is unchanged from the response time for the first I/O request. Identifying the response time for the first I/O request may include monitoring response times during a pre-determined interval. Monitoring response times may include comparing two cycles of performance for the first application. A maximum delay capable of being added to the second I/O request received from the second application in the second storage group assigned to the second storage level may be assigned. A probability of delay proportionally for each service level lower than the first storage level may be increased.

In another example implementation, a computing system may include one or more processors and one or more memories configured to perform operations that may include but are not limited to receiving a first I/O request from a first application in a first storage group assigned to a first storage level. A response time for the first I/O request may be identified. It may be identified that the response time for the first I/O request is outside a pre-determined response time. A delay may be added to a second I/O request received from a second application in a second storage group assigned to a second storage level based upon, at least in part, identifying that the response time for the first I/O request is outside the pre-determined response time.

One or more of the following example features may be included. The pre-determined response time may include a minimum response time specified by the first storage level and a maximum response time specified by the first storage level. It may be determined that a response time for a third I/O request from the first application in the first storage group assigned to the first storage level is unchanged from the response time for the first I/O request and the delay may be precluded from being added to a fourth I/O request received from the second application in the second storage group assigned to the second storage level based upon, at least in part, determining that the response time for the third I/O request is unchanged from the response time for the first I/O request. Identifying the response time for the first I/O request may include monitoring response times during a pre-determined interval. Monitoring response times may include comparing two cycles of performance for the first application. A maximum delay capable of being added to the second I/O request received from the second application in the second storage group assigned to the second storage level may be assigned. A probability of delay proportionally for each service level lower than the first storage level may be increased.

In another example implementation, a computer program product may reside on a computer readable storage medium having a plurality of instructions stored thereon which, when executed across one or more processors, may cause at least a portion of the one or more processors to perform operations that may include but are not limited to receiving a first I/O request from a first application in a first storage group assigned to a first storage level. A response time for the first I/O request may be identified. It may be identified that the response time for the first I/O request is outside a pre-determined response time. A delay may be added to a second I/O request received from a second application in a second storage group assigned to a second storage level based upon, at least in part, identifying that the response time for the first I/O request is outside the pre-determined response time.

One or more of the following example features may be included. The pre-determined response time may include a minimum response time specified by the first storage level and a maximum response time specified by the first storage level. It may be determined that a response time for a third I/O request from the first application in the first storage group assigned to the first storage level is unchanged from the response time for the first I/O request and the delay may be precluded from being added to a fourth I/O request received from the second application in the second storage group assigned to the second storage level based upon, at least in part, determining that the response time for the third I/O request is unchanged from the response time for the first I/O request. Identifying the response time for the first I/O request may include monitoring response times during a pre-determined interval. Monitoring response times may include comparing two cycles of performance for the first application. A maximum delay capable of being added to the second I/O request received from the second application in the second storage group assigned to the second storage level may be assigned. A probability of delay proportionally for each service level lower than the first storage level may be increased.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
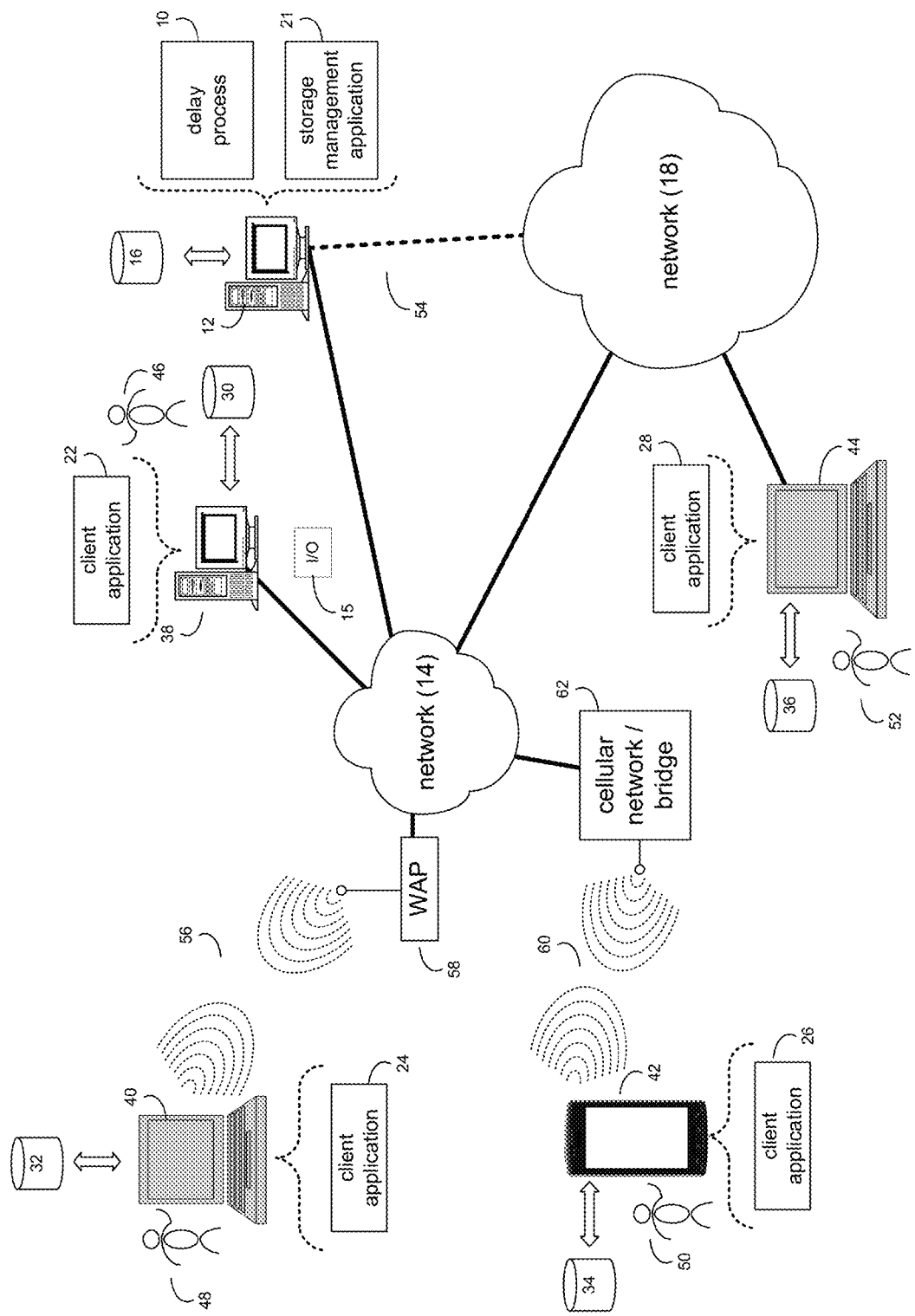
FIG. 1 is an example diagrammatic view of a delay process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function (s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown delay process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic.

Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a delay process, such as delay process 10 of FIG. 1, may receive, by a computing device, a first I/O request (e.g., I/O 15) from a first application in a first storage group assigned to a first storage level. A response time for the first I/O request may be identified. It may be identified that the response time for the first I/O request is outside a pre-determined response time. A delay may be added to a second I/O request received from a second application in a second storage group assigned to a second storage level based upon, at least in part, identifying that the response time for the first I/O request is outside the pre-determined response time.

In some implementations, the instruction sets and subroutines of delay process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, delay process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, delay process 10 and/or storage management application 21 may be accessed via one or more of client applications 22, 24, 26, 28. In some implementations, delay process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within delay process 10, a component of delay process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of delay process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM).

Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of delay process 10 (and vice versa). Accordingly, in some implementations, delay process 10 may be a purely server-side application, a purely client-side application, or a hybrid server-side/client-side application that is cooperatively executed by one or more of client applications 22, 24, 26, 28 and/or delay process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, delay process 10, and storage management application 21, taken singly or in any combination, may effectuate some or all of the same functionality, any description of effectuating such functionality via one or more of client applications 22, 24, 26, 28, delay process 10, storage management application 21, or combination thereof, and any described interaction(s) between one or more of client applications 22, 24, 26, 28, delay process 10, storage management application 21, or combination thereof to effectuate such functionality, should be taken as an example only and not to limit the scope of the disclosure.

In some implementations, one or more of users 46, 48, 50, 52 may access computer 12 and delay process 10 (e.g., using one or more of client electronic devices 38, 40, 42, 44) directly through network 14 or through secondary network 18. Further, computer 12 may be connected to network 14 through secondary network 18, as illustrated with phantom link line 54. Delay process 10 may include one or more user interfaces, such as browsers and textual or graphical user interfaces, through which users 46, 48, 50, 52 may access delay process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
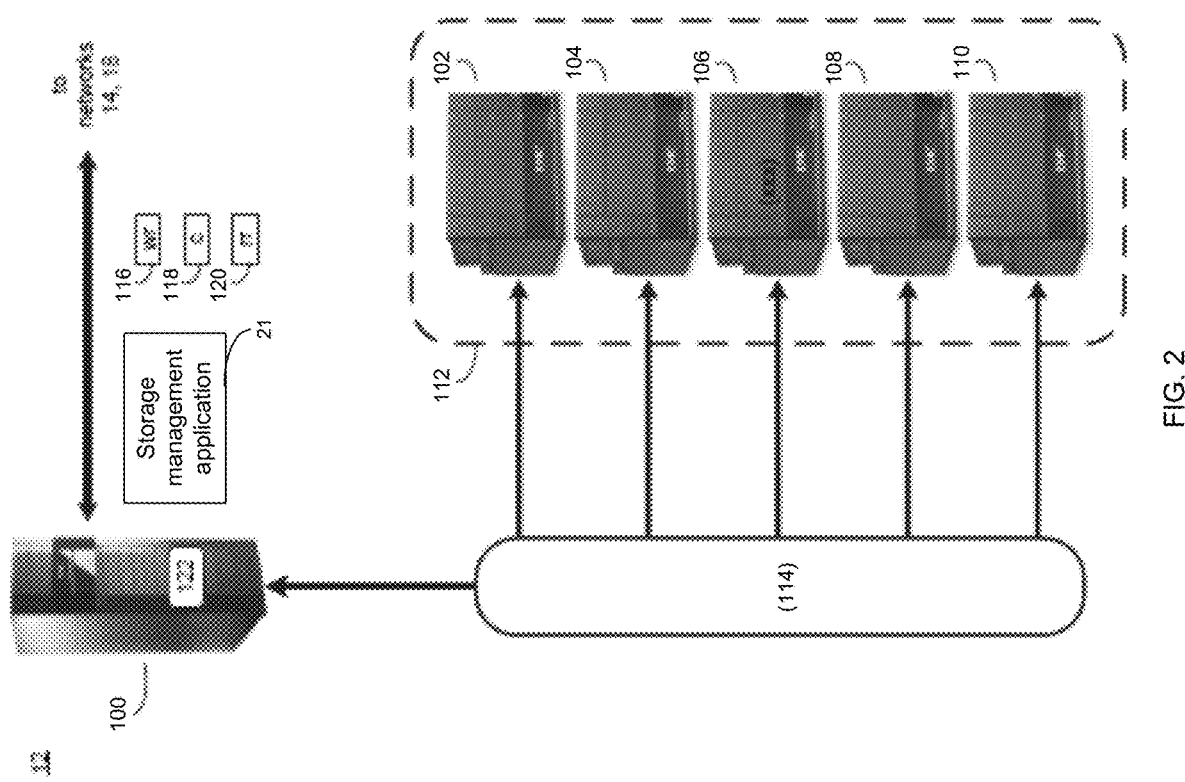
FIG. 2 is an example diagrammatic view of a computer of FIG. 1 according to one or more example implementations of the disclosure.
Figure 3:
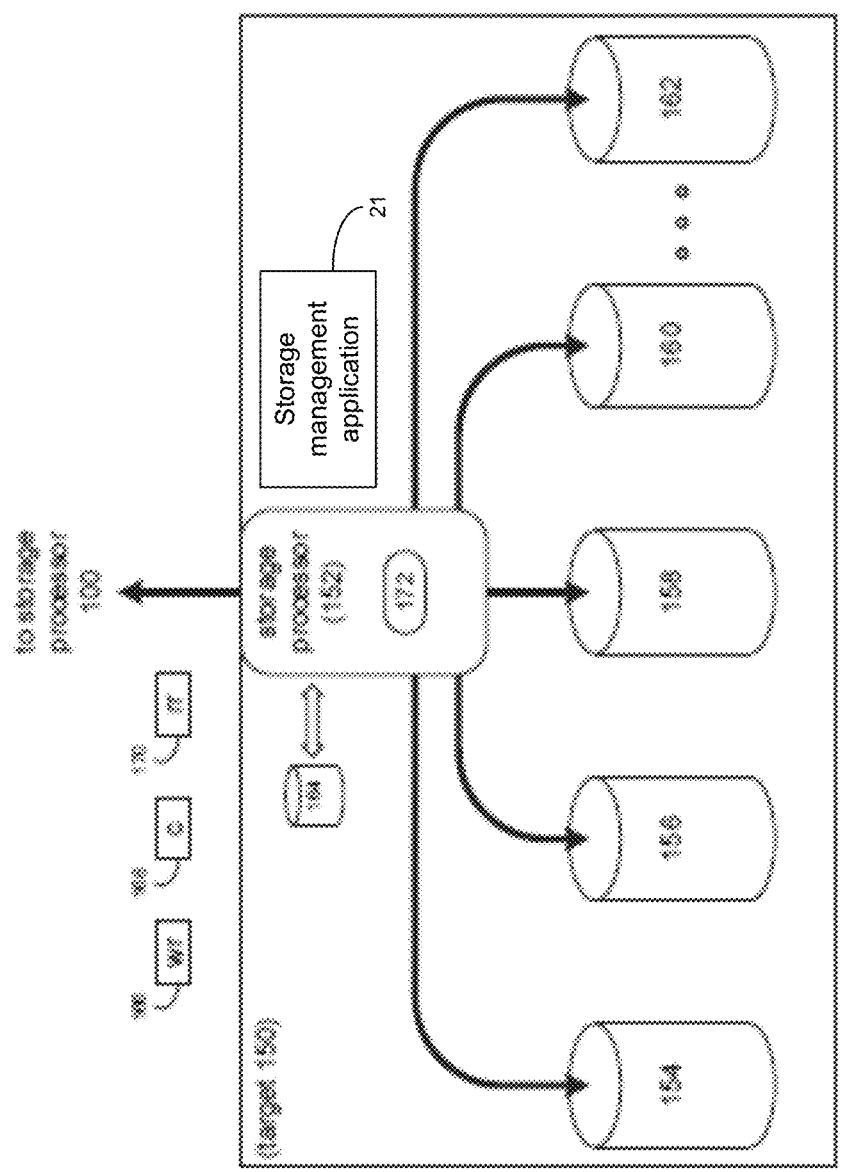
FIG. 3 is an example diagrammatic view of a storage target of FIG. 1 according to one or more example implementations of the disclosure.
Figure 4:
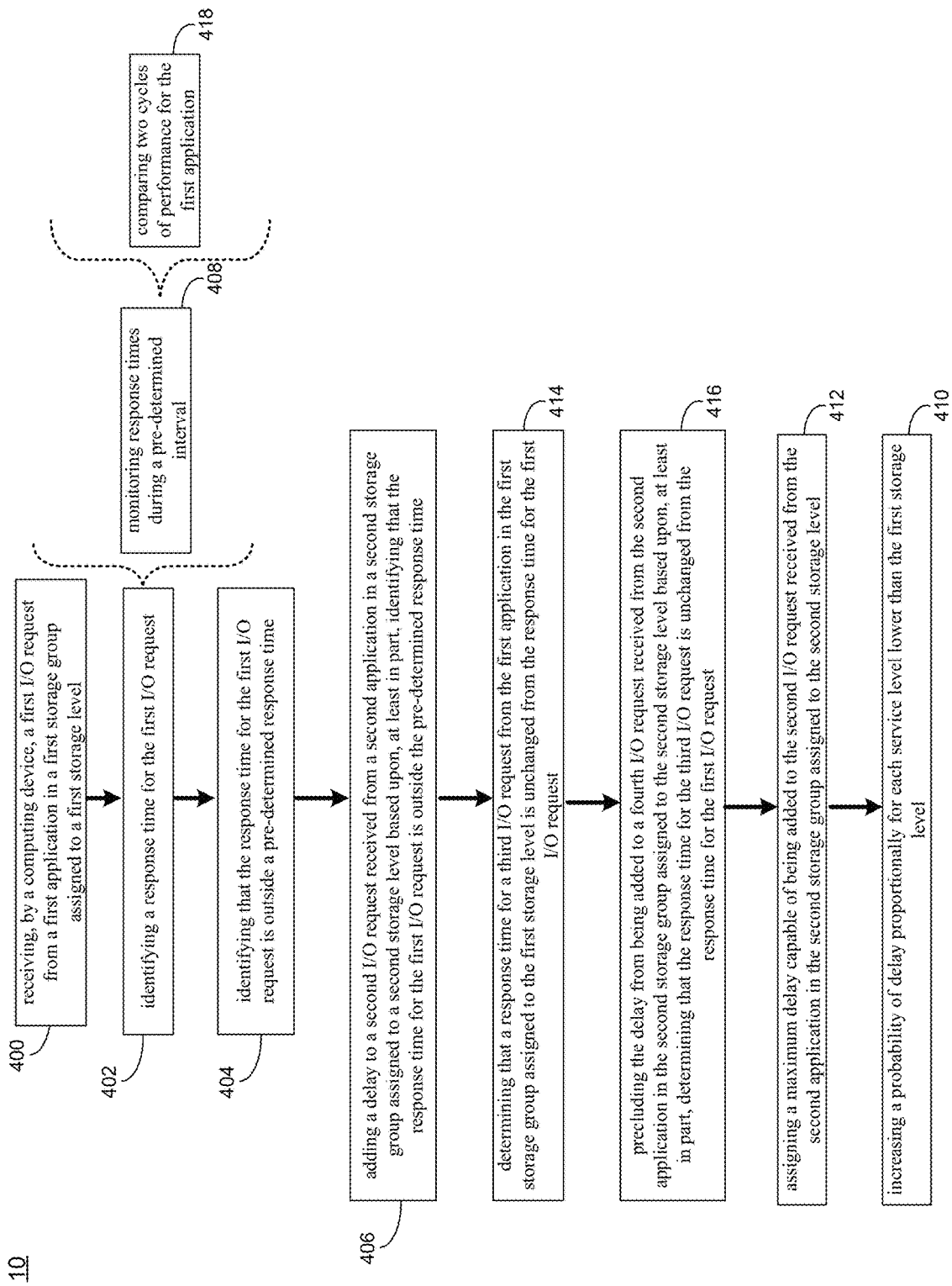
FIG. 4 is an example flowchart of a delay process according to one or more example implementations of the disclosure.
Figure 5:
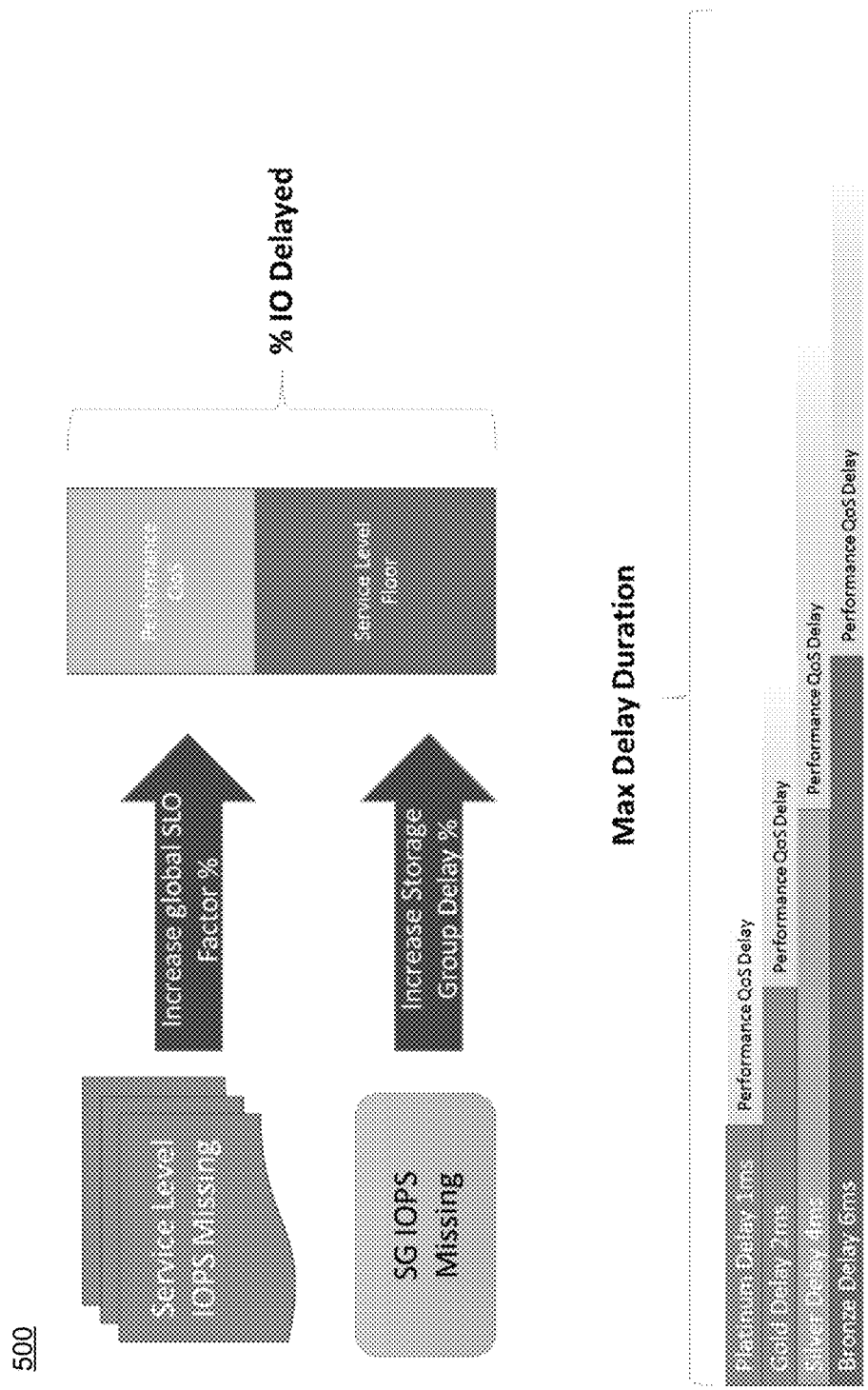
FIG. 5 is an example diagrammatic view of an example max delay block diagram layout according to one or more example implementations of the disclosure.
Figure 6:
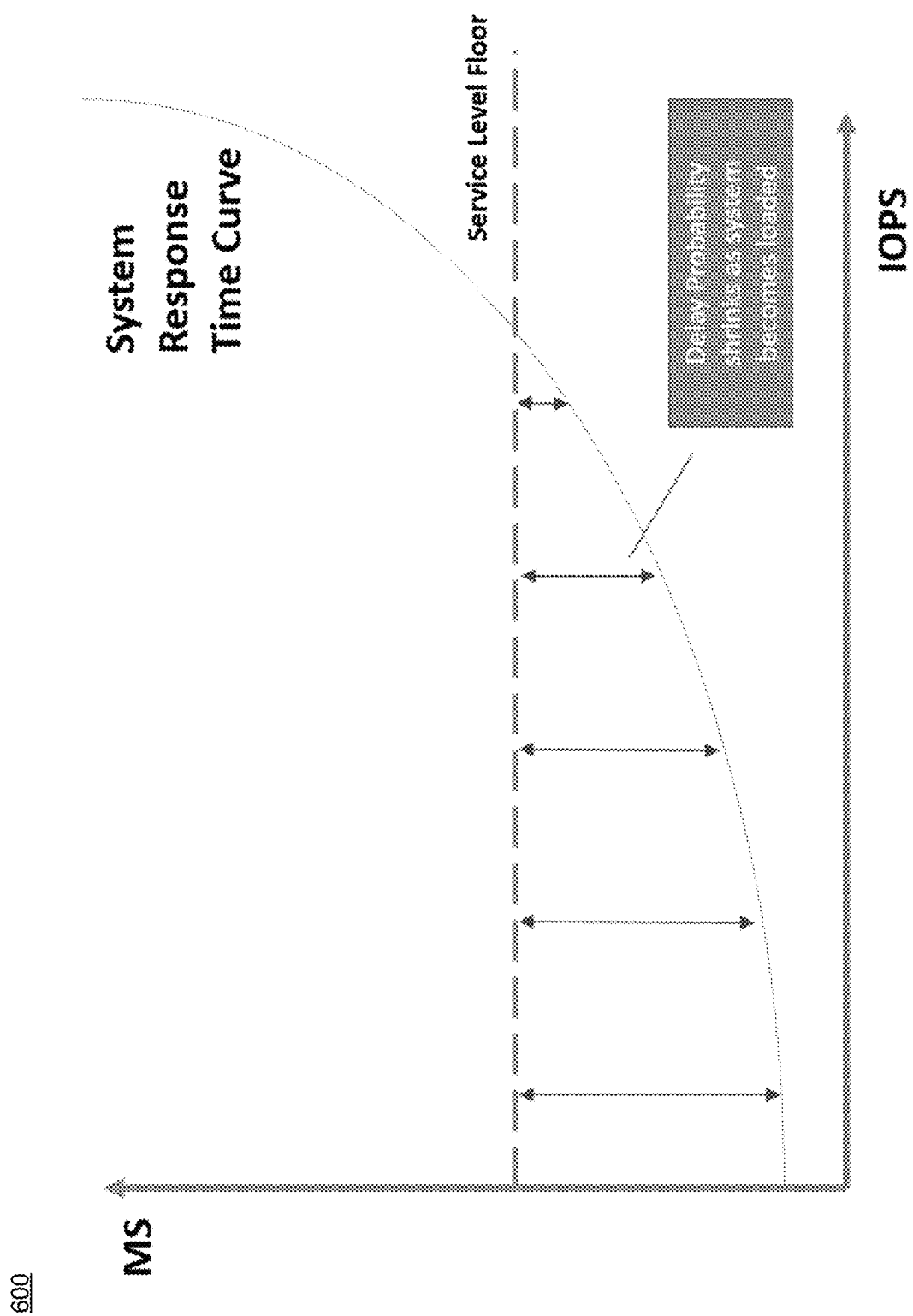
FIG. 6 is an example diagrammatic view of an example response time curve probability chart according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or delay process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

Generally, to allow a user to implement an application specific host I/O limit, the user must manually assign such limits to each application individually. For instance, the user may be required to define precisely how many I/Os per second (IOPS) an application is allowed to do, which in many cases they may not be aware. Moreover, such a limit of TOPS may be strictly enforced, such that during idle periods when there are more than enough resources to process all application I/Os regardless of priority, the lower priority application may still be throttled, and thus cannot take advantage of the additional system resources even though it would not be an impact on the higher priority applications.

As such, as will be discussed in greater detail below, delay process 10 may implement the concept of a storage group (SG) and service level (SL) in a way that allows differentiated application performance, helps ensure that mission critical applications get the performance they need, without the need for overly burdensome manual input, without denying system resources to lower priority applications should they be available without impacting higher priority applications, and helps ensure that lower priority applications are minimally disruptive to higher priority ones.

As will be discussed below, delay process 10 may at least help, e.g., the improvement of an existing storage technology, necessarily rooted in computer technology in order to overcome an example and non-limiting problem specifically arising in the realm of data storage. For instance, delay process 10 may use an efficient process to improve the application of prioritizing application I/Os.

The Delay Process:

As discussed above and referring also at least to the example implementations of FIGS. 4-7, delay process 10 may receive 400, by a computing device, a first I/O request from a first application in a first storage group assigned to a first storage level. Delay process 10 may identify 402 a response time for the first I/O request. Delay process 10 may identify 404 that the response time for the first I/O request is outside a pre-determined response time. Delay process 10 may add 406 a delay to a second I/O request received from a second application in a second storage group assigned to a second storage level based upon, at least in part, identifying that the response time for the first I/O request is outside the pre-determined response time.

In some implementations, delay process 10 may receive 400, by a computing device, a first I/O request from a first application in a first storage group assigned to a first storage level. For instance, assume for example purposes only that a user (e.g., user 46) is running a plurality of applications (e.g., via client computing device 36). In the example, each of these applications may have varying importance levels (e.g., relative importance of an application meeting its performance goals), and as such, I/Os received from these applications may have an associated priority level in terms of how long it should take to process and/or respond to the application's I/O as they are received 400 at the storage system level.

In the example, rather than having the user/admin manually assign a priority to each application individually, delay process 10 may enable applications with similar priority to be grouped together (e.g., in a storage group (SG)). For instance, assume for example purposes only that there are a plurality of distinct service levels (SLs) of application priority (e.g., diamond, platinum, gold, silver, bronze, etc.). In the example, the priority level in the SLs may be in decreasing order of priority. Thus, in the example, any number of applications may be assigned by delay process 10 to a particular SG, and each SG may be assigned a particular SL, resulting in each application in the SG being assigned the SL of the SG.

In some implementations, delay process 10 may identify 402 a response time for the first I/O request. For instance, and continuing with the above example, further assume for example purposes only that an application in a SG assigned with the diamond SL (e.g., the highest priority service level) has sent an I/O request that is received 400 by delay process 10. In the example, delay process 10 may identify 402 how long it took for a response to the I/O request (e.g., the first I/O request) to occur.

In some implementations, identifying 402 the response time for the first I/O request may include monitoring 408 response times during a pre-determined interval. For instance, delay process 10 may maintain a control loop that monitors 408 and samples device level stats and aggregate them up to the SG level (e.g., every 5 second, 30 seconds, etc.). In some implementations, the volume of application I/Os that are meeting their SGs assigned SL response times, missing their SGs assigned SL response times, and which are delayed may be counted distinctly. All existing statistics may be maintained and leverage as needed.

As noted above, SG with its associated SL may have specific performance goals (e.g., pre-determined response times) required for the applications in the SG In some implementations, the pre-determined response time may include a minimum response time specified by the first storage level and a maximum response time specified by the first storage level. For example, the existing SLs may have a minimum and a maximum response time component that may be used by delay process 10 to determine if a SG is in compliance with the performance envelop. There may be at least two types of functionality that may be implemented to introduce delays (discussed in greater detail below). The first type may be the "floor" (e.g., the minimum response time specified by the SL, where delay process 10 may add a delay to an I/O if necessary such that its average response time will be >=the minimum). The second type may be the "ceiling" (e.g., the maximum response time specified by the SL, which may be used by delay process 10 to determine if a SG is meeting its objective or not). As will be discussed below, when a SG is missing the performance target, it may trigger a penalty on lower priority SGs.

In some implementations, delay process 10 may identify 404 that the response time for the first I/O request is outside a pre-determined response time. For instance, and referring to Table 1 below, the table shows the various SLs, their respective minimum and maximum response times, and which SLs may eventually be subjected to delays should response times for higher priority applications miss their performance goals. In the example, delay process 10 may compare the response time to the first I/O request (e.g., assigned in a SG with an associated diamond SL) against the Service Level range. Context may be maintained for each SL to measure the volume and response time of the I/Os that are meeting performance and another for the I/Os that are out of compliance. In the example, if the first I/O request had a response time less than or equal to 2 ms, delay process 10 may identify 404 that the response time for the first I/O request is within the SL's pre-determined response time of 2 ms. On the other hand, if the first I/O request had a response time greater than 2 ms, delay process 10 may identify 404 that the response time for the first I/O request is outside the SL's pre-determined response time of 2 ms. It will be appreciated that the number of SLs, as well as their respective ceiling and floor levels are merely for example purposes only and not intended to limit the scope of the disclosure. As such, more or less SL levels and various ceilings and floors may be used without departing from the scope of the disclosure.

| Service Level | Floor | Ceiling | Penalizes |
|---|---|---|---|
| Diamond | Never | 2 ms | Platinum, Gold, Silver, Bronze, Optimized |
| Platinum | Never | 3 ms | Gold, Silver, Bronze, Optimized |
| Gold | Never | 6 ms | Silver, Bronze, Optimized |
| Silver | 4 ms | 12 ms | Bronze, Optimized |
| Bronze | 8 ms | 16 ms | Optimized |
| Optimized | Never | None | |

In some implementations, delay process 10 may add 406 a delay to a second I/O request received from a second application in a second storage group assigned to a second storage level based upon, at least in part, identifying that the response time for the first I/O request is outside the pre-determined response time. For instance, assume for example purposes only that delay process 10 has identified 404 that the response time for the first I/O request is outside the SL's pre-determined response time of 2 ms. In the example, delay process 10 may add 406 a delay to I/Os in SGs assigned to lower level priority SLs according to Table 1. For instance, in the example, delay process 10 may for the diamond SL trigger a response time penalty added to all non-diamond SGs (i.e., all SGs with SLs less than diamond) as a result of identifying 404 that the response time for the first I/O request is outside the (diamond) SL's pre-determined response time of 2 ms. Similarly, if the first I/O were from an application in a SG assigned a silver SG, delay process 10 may for the silver SL trigger a response time penalty added to all SGs with SLs less than silver, excluding gold, platinum, and diamond with higher level priorities) as a result of identifying 404 that the response time for the first I/O request is outside the (silver) SL's pre-determined response time of 12 ms. As such, the response time of SGs may be monitored and when they begin to exceed the boundaries of their SL, delay process 10 may help ensure that lower priority storage is throttled, where in some implementations, the throttling may be done at the beginning of an I/O loop.

In some implementations, delay process 10 may implement a delay queue that may defer execution of the I/O until the specified delay has expired. The fact that a particular I/O was delayed may be stored by delay process 10, e.g., within a job record, so that other components may be aware of the fact that an I/O was delayed when it first arrived. In some implementations, a factor of 0-15 may be saved to indicate the relative magnitude of delay duration.

In some implementations, delay process 10 may leverage existing Host I/O Limit infrastructure by automating the amount of delay an application experiences. Each SG may have a globally maintained pair of parameters that may be checked as each I/O arrives to determine if and how much delay it will incur. For example, 20% random chance of a random delay between 200-4000 microseconds as shown in Table 2 below.

| Service Level | Delay Probability | Max Delay Duration |
|---|---|---|
| Diamond | 0% | 0 us |
| Platinum | 0% | 1000 us |
| Gold | 0% | 3000 us |
| Silver | 20% | 4000 us |
| Bronze | 40% | 8000 us |
| Optimized | 0% | 12000 us |

In some implementations, delay process 10 may monitor each SL and may determine if there are any SGs that are missing their SL on average. In some implementations, delayed I/Os may not be accounted for when determining if the SG is missing the SL performance requirements. The output of the control algorithm may include a per SG delay probability and delay duration. Delay process 10 may monitor the SG relative to its SL Floor and have the delay probability adjusted to ensure that it is within the range specified. For instance, when the system is configured with all bronze for example, and the backend begins to ramp up response time, the delay probability may reduce proportionally to ensure consistent response time levels as the system loads.

In some implementations, delay process 10 may increase 410 a probability of delay proportionally for each service level lower than the first storage level. For instance, when there are SL I/Os that are out of compliance, delay process 10 may begin to increase 410 the probability of delay proportionally for each level. Delay process 10 may maintain a global SLO compliance factor that may scale up the table. For example, when all SGs are meeting their SL requirements, the factor may be zero. When there are SGs missing their SL requirements, delay process 10 may begin to increase the factor. The factor may translate into a percentage increase in the probability for all SLs below the SL that is missing its requirements.

For example:

Probability of Delay=(SL Delay Probability+SLO Compliance Factor)Delay Duration=(Random up to Max Delay Duration)+(Max Delay Duration*SLO Compliance Factor)

TABLE 3 shows a delay table after, e.g., 5% increase in SLO Compliance Factor

| Service Level | Delay Probability | Max Delay Duration |
|---|---|---|
| Diamond | 0% | 0 us |
| Platinum | 0% + 5% = 5% | 1000 us + 5% = 1050 us |
| Gold | 0% + 5% = 5% | 3000 us + 5% = 3150 us |
| Silver | 20% + 5% = 25% | 4000 us + 5% = 4200 us |
| Bronze | 40% + 5% = 45% | 8000 us + 5% = 8400 us |
| Optimized | 0% + 5% = 5% | 12000 us + 5% = 12600 us |

In some implementations, delay process 10 may assign 412 a maximum delay capable of being added to the second I/O request received from the second application in the second storage group assigned to the second storage level. For example, and referring at least to the example implementation of FIG. 5, an example max delay block diagram layout 500 is shown, and referring at least to the example implementation of FIG. 6 where an example chart 600 shows a response time curve of the delay probability. In the example, a maximum SLO compliance factor may be defined in order to prevent delay process 10 from introducing delays that are too high (e.g., 500%). In some implementations, the maximum assigned delay may be used as a cap when certain SLs are aggressively being delayed.

In some implementations, delay process 10 may determine 414 that a response time for a third I/O request from the first application in the first storage group assigned to the first storage level is unchanged from the response time for the first I/O request and delay process 10 may preclude 416 the delay from being added to a fourth I/O request received from the second application in the second storage group assigned to the second storage level based upon, at least in part, determining that the response time for the third I/O request is unchanged from the response time for the first I/O request. For instance, in some implementations, delay process 10 may implement a feedback mechanism that may be used to monitor the apparent benefit that the delay penalty has to the target SG response time. A dampening factor may be used to ensure that the SG is only penalized when it proves effective in lowering the response time of the target SG This may help to resolve issues where the high latency is from an outside influence, e.g., a large synchronous RDF delay. As such, even if a diamond level SG misses its performance goals, if delay process 10 determines 414 that adding a delay to the lower level SGs will not improve the response time for the diamond level SG then delay process 10 may preclude 416 the addition of the delay to the lower level SGs (and therefore the I/Os issued from the applications in the lower level SGs).

In some implementations, monitoring 408 response times may include comparing 418 two cycles of performance for the first application. For instance, delay process 10 may include a learning model that may be used to determine whether the throttling (addition of delay) will be helpful in meeting the needs of the service level IOPS. In some implementations, two separate cycles will run (e.g., A, B) where the influence may be changed in each cycle. For example, A cycle may be 3000 seconds and B cycle may be 300 seconds. In the example, A cycle may use 100% of the bias, while B cycle may use only 80%. Delay process 10 may monitor the difference in the application performance from A cycle and B cycle to determine if there is a difference. Once delay process 10 determines that there is no difference in the performance when changing the bias, delay process 10 may stop increasing the bias. This may enable delay process 10 to detect that there is a performance impact that is beyond its ability to influence and prevent needless further degradation.

In some implementations, delay process 10 may use a cache layer to consume the per I/O indication that a delay has occurred. When a delay has occurred, the cache layer (via delay process 10) may be able to bias the LRU to cause the track to fall out of cache sooner. The amount of bias may vary and may be tuned through performance testing. In some implementations, I/Os that take advantage of ORM where a cache slot is allocated asynchronously after the I/O, may skip the slot allocation.

Figure 7:
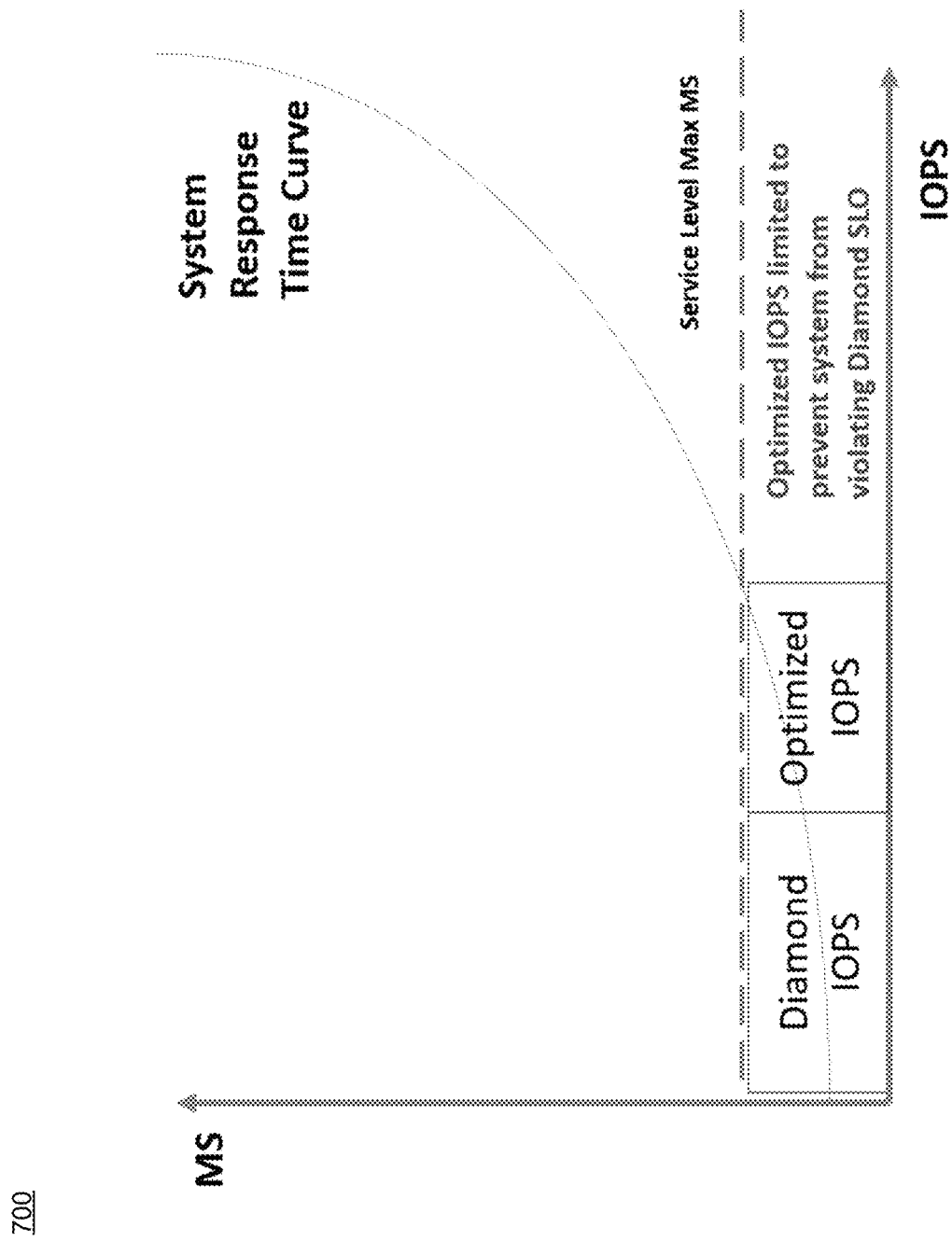
FIG. 7 is an example diagrammatic view of an example response time curve probability chart according to one or more example implementations of the disclosure.

In some implementations, and referring at least to the example implementation of FIG. 7, an example system response time curve 700 is shown. In FIG. 7, an example "protection application" model may involve the intent of a user to help ensure that a set of SGs are insulated from performance impact from other applications, e.g., the so called "noisy neighbor." In the example, the customer (e.g., via a user interface associated with delay process 10) may set critical applications to diamond and non-critical applications to optimized.

In an example "service provider chargeback" model, SGs may have different cost basis. A higher performance application may cost more than a lower performance application. The silver and bronze SLs may allow for the user to introduce implicit delays in a SG even though the array is capable of providing a better response time.

In an example "relative application priority" model, assume the user has a desire to have the best possible performance of all applications, similar to the above-noted "protect application" model, except that there is a relative priority of the protected applications. Here, the user (via delay process 10) may use diamond, platinum, and gold SLs, and as long as the response time is not being impacted, no SGs are delayed. Once there begins to be an impact, gold and platinum may begin to experience delay, but it may be proportional to the SL. Platinum may have fewer I/Os delayed for less duration than gold, and all the lower SLs.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
receiving, by a computing device, a first I/O request from a first application in a first storage group assigned to a first storage level, wherein the first storage group contains a first plurality of applications sharing a same service level;
identifying a response time for the first I/O request;
identifying that the response time for the first I/O request is outside a pre-determined response time;
adding a delay to a second I/O request received from a second application in a second storage group assigned to a second storage level based upon, at least in part, identifying that the response time for the first I/O request is outside the pre-determined response time, wherein the second storage group contains a second plurality of applications sharing a same service level, wherein the service level associated with the first storage group is higher in priority than the service level associated with the second storage group, wherein the delay is applied to the second I/O request received from the second application in the second storage group assigned to the second storage level when a dampening factor applied to the second storage group indicates applying the delay will improve the response time for at least the first I/O request from the first application in the first storage group assigned to a first storage level;
determining that a response time for a third I/O request from the first application in the first storage group assigned to the first storage level is unchanged from the response time for the first I/O request; and
precluding the delay from being added to a fourth I/O request received from the second application in the second storage group assigned to the second storage level based upon, at least in part, determining that the response time for the third I/O request is unchanged from the response time for the first I/O request.

2. The computer-implemented method of claim 1 wherein the pre-determined response time includes a minimum response time specified by the first storage level and a maximum response time specified by the first storage level.

3. The computer-implemented method of claim 1 wherein identifying the response time for the first I/O request includes monitoring response times during a pre-determined interval.

4. The computer-implemented method of claim 3 wherein monitoring response times includes comparing two cycles of performance for the first application.

5. The computer-implemented method of claim 1 further comprising assigning a maximum delay capable of being added to the second I/O request received from the second application in the second storage group assigned to the second storage level.

6. The computer-implemented method of claim 1 further comprising increasing a probability of delay proportionally for each service level lower than the first storage level.

7. A computer program product residing on a non-transitory computer readable storage medium having a plurality of instructions stored thereon which, when executed across one or more processors, causes at least a portion of the one or more processors to perform operations comprising:
receiving, by a computing device, a first I/O request from a first application in a first storage group assigned to a first storage level, wherein the first storage group contains a first plurality of applications sharing a same service level;
identifying a response time for the first I/O request;
identifying that the response time for the first I/O request is outside a pre-determined response time;
adding a delay to a second I/O request received from a second application in a second storage group assigned to a second storage level based upon, at least in part, identifying that the response time for the first I/O request is outside the pre-determined response time, wherein the second storage group contains a second plurality of applications sharing a same service level, wherein the service level associated with the first storage group is higher in priority than the service level associated with the second storage group, wherein the delay is applied to the second I/O request received from the second application in the second storage group assigned to the second storage level when a dampening factor applied to the second storage group indicates applying the delay will improve the response time for at least the first I/O request from the first application in the first storage group assigned to a first storage level;
determining that a response time for a third I/O request from the first application in the first storage group assigned to the first storage level is unchanged from the response time for the first I/O request; and
precluding the delay from being added to a fourth I/O request received from the second application in the second storage group assigned to the second storage level based upon, at least in part, determining that the response time for the third I/O request is unchanged from the response time for the first I/O request.

8. The computer program product of claim 7 wherein the pre-determined response time includes a minimum response time specified by the first storage level and a maximum response time specified by the first storage level.

9. The computer program product of claim 7 wherein identifying the response time for the first I/O request includes monitoring response times during a pre-determined interval.

10. The computer program product of claim 9 wherein monitoring response times includes comparing two cycles of performance for the first application.

11. The computer program product of claim 7 wherein the operations further comprise assigning a maximum delay capable of being added to the second I/O request received from the second application in the second storage group assigned to the second storage level.

12. The computer program product of claim 7 wherein the operations further comprise increasing a probability of delay proportionally for each service level lower than the first storage level.

13. A computing system including one or more processors and one or more memories configured to perform operations comprising:
receiving a first I/O request from a first application in a first storage group assigned to a first storage level, wherein the first storage group contains a first plurality of applications sharing a same service level;
identifying a response time for the first I/O request;
identifying that the response time for the first I/O request is outside a pre-determined response time;
adding a delay to a second I/O request received from a second application in a second storage group assigned to a second storage level based upon, at least in part, identifying that the response time for the first I/O request is outside the pre-determined response time, wherein the second storage group contains a second plurality of applications sharing a same service level, wherein the service level associated with the first storage group is higher in priority than the service level associated with the second storage group, wherein the delay is applied to the second I/O request received from the second application in the second storage group assigned to the second storage level when a dampening factor applied to the second storage group indicates applying the delay will improve the response time for at least the first I/O request from the first application in the first storage group assigned to a first storage level;
determining that a response time for a third I/O request from the first application in the first storage group assigned to the first storage level is unchanged from the response time for the first I/O request; and
precluding the delay from being added to a fourth I/O request received from the second application in the second storage group assigned to the second storage level based upon, at least in part, determining that the response time for the third I/O request is unchanged from the response time for the first I/O request.

14. The computing system of claim 13 wherein the pre-determined response time includes a minimum response time specified by the first storage level and a maximum response time specified by the first storage level.

15. The computing system of claim 13 wherein identifying the response time for the first I/O request includes monitoring response times during a pre-determined interval.

16. The computing system of claim 15 wherein monitoring response times includes comparing two cycles of performance for the first application.

17. The computing system of claim 13 wherein the operations further comprise increasing a probability of delay proportionally for each service level lower than the first storage level.

* * * * *